United States Patent [19]

Fletcher et al.

[11] Patent Number: 5,340,016

[45] Date of Patent: * Aug. 23, 1994

[54] SOLDERING METHOD AND APPARATUS

[75] Inventors: Linda M. Fletcher, Yardley; Leslie A. Guth; Douglas W. Monroe, both of Newtown, all of Pa.

[73] Assignee: AT&T Bell Laboratories, Murray Hill, N.J.

[*] Notice: The portion of the term of this patent subsequent to Aug. 10, 2010 has been disclaimed.

[21] Appl. No.: 78,666

[22] Filed: Jun. 16, 1993

Related U.S. Application Data

[63] Continuation of Ser. No. 970,409, Nov. 2, 1992, Pat. No. 5,234,157.

[51] Int. Cl.⁵ .......................... B23K 1/00; B23K 1/012
[52] U.S. Cl. ..................... 228/219; 228/224; 228/230
[58] Field of Search ............... 228/179, 214, 219, 223, 228/224, 230, 240, 180.1, 52; 219/227, 229

[56] References Cited

U.S. PATENT DOCUMENTS

| | | | |
|---|---|---|---|
| 4,771,929 | 9/1988 | Bahr et al. | 228/230 |
| 5,182,435 | 1/1993 | Wang | 228/20 |
| 5,222,655 | 6/1993 | Moretti | 228/230 |
| 5,234,157 | 8/1993 | Fletcher et al. | 228/219 |

FOREIGN PATENT DOCUMENTS 0283093 10/1990 Fed. Rep. of Germany ........ 228/52

Primary Examiner—Samuel M. Heinrich
Attorney, Agent, or Firm—Robert B. Levy

[57] ABSTRACT

A technique is provided for manually performing a soldering operation on an article with a low-solids flux-containing solder to bond an object to the article with a reduced amount of flux residues. The technique is practiced by first manually applying heat to the article and to the object which is in contact therewith, such as by contacting the article and/or object with a heated tip of a soldering pencil, iron or gun. Once the object and article have been heated, a low-solids flux-containing solder is then applied so as to be reflowed upon contact with the heated article and the object in order to bond them together when the solder solidifies. Simultaneously, heated air (i.e., air heated above the ambient temperature) is directed at the article and the object towards the region where the solder is being applied to maintain any flux vapors, which were created upon heating of the solder, in their vaporous state. The heated air prevents condensation, and therefore unwanted deposition, of flux residues on the soldered article.

3 Claims, 1 Drawing Sheet

SOLDERING METHOD AND APPARATUS

This is a continuation of application Ser. No. 07/970,409 filed Nov. 2, 1992, now U.S. Pat. No. 5,234,157.

TECHNICAL FIELD

This invention relates to a method and apparatus for manually soldering an article, such as a component lead, to an object, such as a metallized area on a substrate, with a low-solids, flux-containing solder so as to achieve a reduced quantity of flux residues following soldering.

Background of the Invention

Soldering is a commonly employed method for mechanically and electrically bonding a lead of an electronic component or a connector to a metallized area on a substrate, such as a circuit board. A typical soldering operation is carried out by heating the lead and the metallized area in contact therewith, and then applying solder so that the solder melts (i.e., reflows) and coats the lead and metallized area. The solder, upon solidification, electrically and mechanically bonds the lead to the metallized area. Prior to actually carrying out a soldering operation, it is often useful to apply soldering flux to the lead and/or to the metallized area. The advantage obtained in applying soldering flux is that the flux acts both to clean and to promote solder wetting to the metallized area and lead, thereby enhancing the quality of the resultant soldering bond.

The disadvantage with most types of solder flux is that the flux leaves a post-solder residue. To obtain a good cosmetic appearance, and to assure good electrical testability of the circuit board, as well as to remove residues which are sometimes corrosive, the circuit board is usually cleaned after soldering. Cleaning is a non-value-added operation and, often, an environmental concern. For these reasons much effort is currently being devoted to developing soldering processes which obviate the need to clean.

One recent approach to reducing the incidence of residues in connection with a manually performed soldering operation is to employ so-called "low-solids core" solder which is comprised of hollow tin-lead solder wire whose core is filled with a low-solids flux. The low-solids flux within such core solder contains a reduced volume of flux solids which yields a reduced mount of flux residue following soldering. The disadvantage of low-solids core solder is that the flux contained within the solder tends to be more chemically active than conventional rosin-based fluxes, and hence the residues tend to be more corrosive. While the corrosion problem associated with the use of low-solids core solder can be obviated by solder-coating the metallized areas prior to soldering the leads thereto, the need to solder coat the metallized areas increases the overall fabrication cost, which is undesirable.

Thus, there is a need for a soldering technique which reduces the amount of flux residues, and hence the corrosion problem, when manually soldering a lead to a bare (i.e., non-solder-coated) metallized area on a substrate with a flux-containing (e.g., core) solder.

SUMMARY OF THE INVENTION

Briefly, in accordance with a preferred embodiment of the invention, a technique is pro,tided for manually performing a soldering operation on an article with a low-solids flux-containing solder to bond an object to the article with a reduced mount of flux residues. The technique is practiced by first manually applying heat to the article and to the object which is in contact therewith, such as by contacting the article and/or object with a heated tip of a soldering pencil, iron or gun. Once the object and article have been heated, a low-solids flux-containing solder is then applied so as to be reflowed upon contact with the heated article and the object in order to bond them together when the solder solidifies. Simultaneously, heated air (i.e., air heated above the ambient temperature) is directed at the article and the object towards the region where the solder is being applied to maintain any flux vapors, which were created upon heating of the solder, in their vaporous state. In other words, the heated air prevents condensation, and therefore unwanted deposition, of flux residues on the soldered article

DETAILED DESCRIPTION

Figure 1:
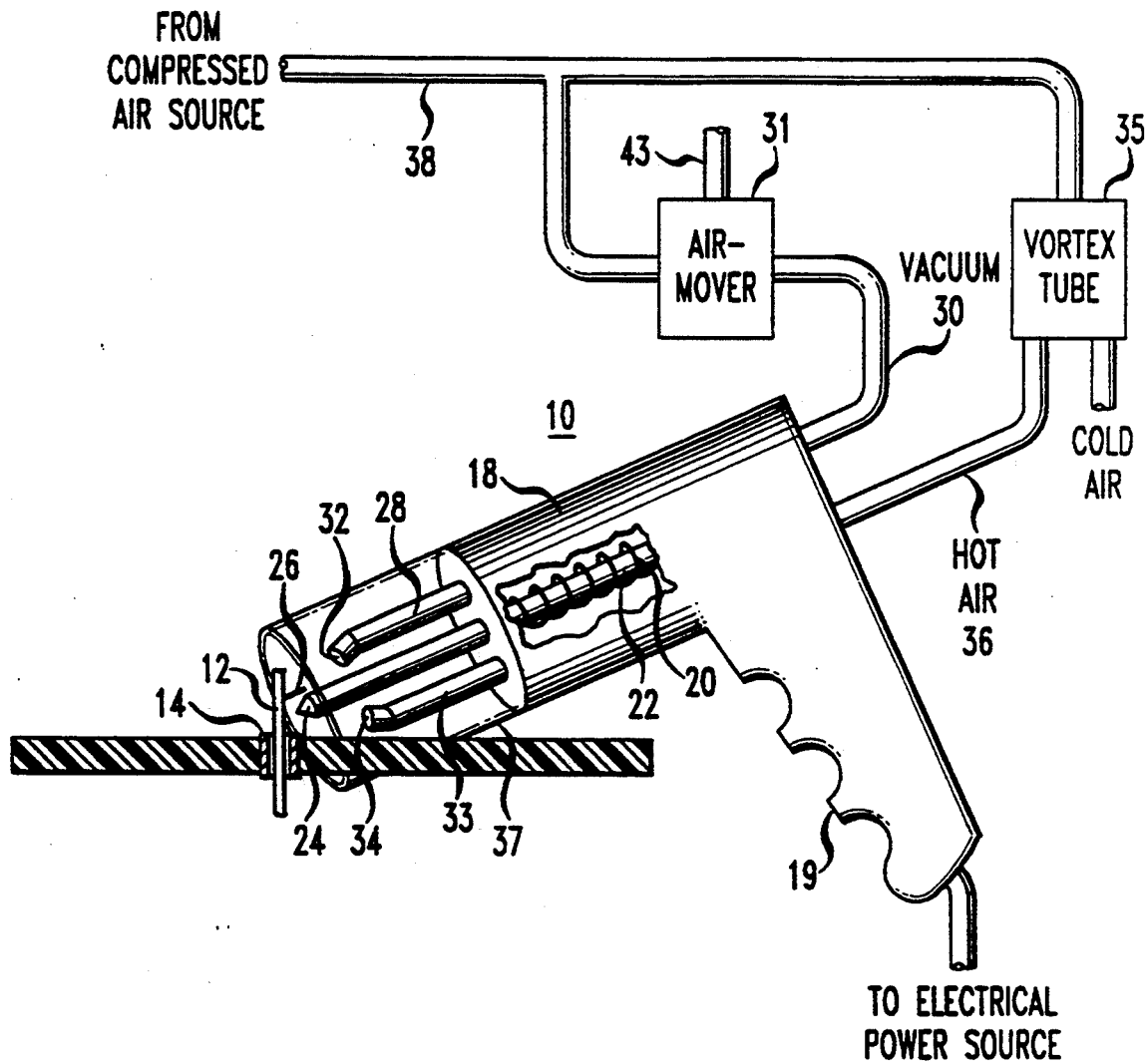
FIG. 1 is block diagram of an apparatus for carrying out soldering in accordance with the technique of the invention.

In FIG. 1 there is shown a soldering apparatus 10, in accordance with a preferred embodiment of the invention, for manually soldering a lead 12 of a component (not shown) such as a connector or an integrated circuit, for example, to a metallized (e.g., copper) area 14 on a substrate 16, typically a printed circuit board. The apparatus 10 comprises a housing 18, typically made from a heat-resistant material, such as a heat-resistant plastic or the like. The housing 18 is provided with a grip 19, which in the illustrated embodiment, takes the form of a pistol grip, to enable an operator (not shown) to hold the housing in a particular orientation. Other types of grips (not shown) may be substituted for the pistol grip 19.

Situated within the housing 18 is an electrical coil 20, which, when electrically energized from an electrical power source (not shown), causes a current to be induced in a ferromagnetic rod 22 so that the rod undergoes ohmic heating. The rod 22 has an tip 24 which projects forward (i.e., leftward) beyond the housing 18 to contact the lead 12 and/or metallized area 14 so that heat from the rod can be transferred thereto. When the lead 12 and metallized area 14 have been sufficiently heated, then solder 26 is applied so as to be reflowed by the heat to coat the lead 12 and the metallized area 14. Once the solder 26 solidifies, the lead 12 becomes mechanically and electrically bonded to the metallized area 14.

In the past, soldering flux (not shown) of a type well known in the electronics industry, was applied to the lead 12 and/or metallized area 14 prior to carrying out the above-described soldering operation to clean the lead and to promote solder wetting to the metallized area, thereby enhancing the quality and reliability of the resultant solder bond. However, most fluxes tend to leave a residue on the lead 12 and/or metallized area 14 which can impair the appearance of the circuit board 16 and its ability to be electrically tested. Depending on the chemical constituency of the flux, such residues can even be corrosive, causing the solder joint between the lead 12 and metallized area 14 to fail, especially when exposed to high temperature and/or humidity. To remove undesirable flux residues from the lead 12 and/or metallized area 14, the circuit board 16 must be cleaned after soldering.

From a manufacturing standpoint, cleaning is an operation which adds no value to the circuit board 16. For this mason, it makes good economic and environmental sense to reduce the mount of flux residues to avoid the need to clean the circuit board 16. One promising technique for reducing the incidence of flux residues is to employ low-solids (i.e., low-residue) core solder as the solder 26 used to solder the lead 12 to the metallized area 14. Low-solids core solder, as is known in the art, generally comprises a hollow fin-lead solder wire whose core is filled with a low-solids flux which contains a reduced volume of flux solids. The reduced volume of flux solids in the solder 26 results in a reduced amount of flux residues during soldering and thus eliminates the need for post-solder cleaning. Moreover, by selecting the solder 26 as core solder, the need to separately apply flux to the lead 12 and/or metallized area 14 is thereby obviated.

In practice, when low-solids core solder is employed to solder the lead 12 to the metallized area 14, no measurable corrosion occurs if the metallized area has previously been solder-coated. In the absence of a solder coating on the metallized area 14 (i.e., when the metallized area is bare), the incidence of corrosion is much greater. While solder coating the metallized area 14 prior to soldering results in no corrosion, such a solder coating increases the overall fabrication cost of the circuit board 16. Currently, there is much interest in being able to manually solder a lead 12 to a bare metallized area 14 with no corrosion.

In accordance with the invention, a technique is provided for obtaining a reduced quantity of residues, and hence a reduced incidence of corrosion, when using core solder 26 to solder the lead 12 to a bare metallized area 14. The technique of the invention is practiced by providing the soldering apparatus 10 with a vacuum conduit 28 which extends out from the housing 18 parallel to the tip 24 so as to lie thereabove. The vacuum conduit 28 is coupled via a vacuum line 30 to a vacuum source 31 (described hereinafter), so that a vacuum can be drawn from an inlet port 32 located at the forward end of the conduit adjacent to the tip 24. By positioning the inlet port 32 of the vacuum conduit 28 at the forward end of the tip 24, flux vapors, created as heat from the tip reflows the core solder 26, will be drawn into the vacuum conduit.

However, we have found that simply drawing a vacuum through the inlet port 32, even when the inlet port is positioned in proximity with the tip 2,4, is not sufficient to reduce the amount of flux residues below the level at which cleaning is no longer necessary. Although the reason why significant levels of flux residues remain notwithstanding the presence of a vacuum during soldering is not completely understood, we believe that the presence of a vacuum proximate the tip 24 creates an air flow across the tip which reduces the surrounding temperature. As a consequence of the reduced temperature surrounding the tip, flux vapors created upon heating of the core solder 26 are believed to condense on the lead 12 and/or metallized area 14 before the vapors can be drawn into the vacuum conduit 28.

To overcome this difficulty, the soldering apparatus 10 is advantageously provided with a heat delivery tube 33 which is carried by the housing 18 so as to extend forward therefrom parallel to the tip 24. The heat delivery tube 33 has an outlet port 34 proximate to the forward end of the tip 24 so as to be opposite the inlet port 32 of the vacuum conduit 28. Heated air (i.e., air heated to a temperature above ambient is supplied to the hot air delivery tube 33 from a hot air delivery source 35 through a hot air supply line 36 so that hot air is exhausted from the delivery tube out through the outlet port 34.

By exhausting hot air out through the outlet port 34 towards the lead 12 and the metallized area 14, the region surrounding both the lead and the metallized area is kept sufficiently warm by the hot air to maintain the flux vapors surrounding the lead and the metallized area in a vaporous state. Thus, such flux vapors can be drawn into the vacuum conduit 28 rather than condense on the lead 12 and/or metallized area 14. In practice, flux residues have been found to be significantly reduced by directing hot air at the lead 12 and the metallized area 14 as compared to the residue level achieved in the absence of such hot air. Reducing the quantity of flux residues not only reduces the incidence of corrosion but is also beneficial from an operator safety viewpoint as well.

To maximize the mount of flux vapors that are removed, it is desirable to confine the vapors by surrounding the tip 24, the vacuum conduit 28, and the hot air delivery robe 33. To this end, the soldering apparatus 10 is provided with a clear, pliable membrane 37 that surrounds the tip 24, the inlet 32 of the vacuum conduit 28, and the outlet port 34 of the heated air delivery tube 33. The membrane 37 has an opening therein (not shown) to allow the tip 24 to protrude therethrough to contact the lead 12 and/or metallized area 14. In practice, the membrane 37 is made from a heat-resistant, clear plastic or rubber.

In accordance with a preferred embodiment of the invention, the vacuum source 31 and the hot air delivery source 35 comprise an air mover and a vortex tube, respectively. The air mover 31 is a well-known device and may be obtained from Vortec Corporation, Cincinnati, Ohio, under the trade name "Transvector." When supplied with compressed air from a compressed air line 38, the air mover 31 draws a vacuum through the vacuum line 30 so that flux vapors in the region surrounding the inlet port 32 will be evacuated into the inlet port 32 and drawn away from the lead 12 and metallized area 14 so as to be exhausted through an exhaust outlet 43 on the air mover which outlet is directed away from the operator. A separate fume-capture system (not shown) may be coupled to the exhaust outlet 43.

The vortex tube 35 is a well-known device and is also obtainable from the Vortec Corporation. When supplied with compressed air through the compressed air line 38, the vortex tube 35 creates a hot air stream which is directed through the hot air line 36, and a cold air stream which is vented to the atmosphere. Alternatively, the cold air stream exhausted by the vortex tube 35 could be used to power the air mover 31, rather than couple the air mover directly to the compressed air line 38. By the use of the air mover 31 and vortex tube 35, the vacuum and hot air stream necessary for the operation of the soldering apparatus 10 can be obtained from a source of compressed air which is generally available in most fabrication facilities. In this way, the need for a mechanical vacuum pump and an electric or gas hot air heater is obviated, achieving a distinct cost savings. Moreover, there is a distinct safety benefit to the use of the air mover 31 and vortex tube 35 since neither contains any moving parts.

Figure 2:
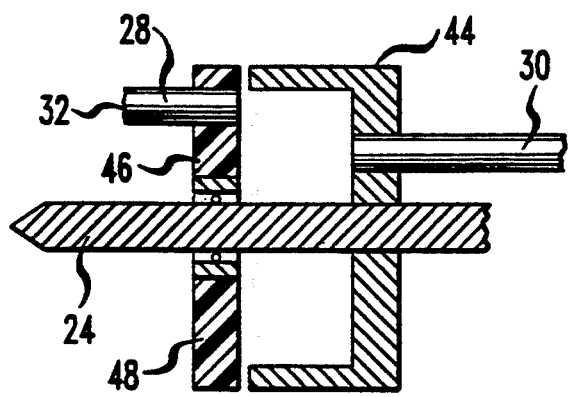
FIG. 2 is a cross-sectional view of an alternate preferred embodiment of a soldering apparatus in accordance with the invention.

As described, the housing 18 of the soldering apparatus 10 is provided with the grip 19 to enable an operator to hold the soldering apparatus in a particular orientation so that the inlet port 32 of the vacuum conduit 28 always lies above the tip 24. The reason for maintaining the vacuum conduit 28 in such an orientation is that the vaporous flux residues tend to rise vertically. By maintaining the vacuum conduit 28 above the tip 24, the solder flux residue capture is thereby maximized. Referring now to FIG. 2, the soldering apparatus 10 of FIG. 1 can be advantageously modified to assure that the inlet port 32 of the vacuum conduit 28 always lies above the solder tip 24, thereby obviating the need for the grip 19. As seen in FIG. 2, the modified soldering apparatus 10 includes a vacuum manifold 44, typically cylindrical in shape, for circumscribing the soldering tip 24 such that the tip extends axially through the manifold. A bearing assembly 46 also circumscribes the soldering tip 24 so as to be spaced forward (i.e., to the left, as seen in FIG. 2) of the manifold 44 so that a very small clearance exists therebetween. The bearing assembly 46 is designed to rotate coaxially about the tip 24.

Extending horizontally through the beating assembly 46, so as to be radially spaced from, and lie parallel to the tip 24, is the vacuum conduit 28. In this way, the vacuum conduit 28 communicates with the vacuum manifold. When the manifold 44 is evacuated, as a consequence of a vacuum drawn through the vacuum line 30 which is coupled to the manifold, a vacuum is thus drawn through the vacuum conduit 28. The bearing assembly 46 is provided with a counterweight 48 positioned so as to lie on the other side of the soldering tip 24 opposite the vacuum conduit 28. The weight of the counterweight 48 is greater than that of the vacuum conduit 28. As a consequence, the beating assembly 46, which is rotatable about the soldering tip 24, will always be maintained by the counterweight 48 in an orientation such that the vacuum conduit 28 lies above the soldering tip regardless of the rotational orientation of the soldering tip. Thus, no matter how an operator holds the soldering apparatus 10 of FIG. 1, the counterweighted beating assembly 46 of FIG. 2 will rotate much like a pendulum so that the inlet port 32 on the vacuum conduit always lies above the tip 2.4.

The foregoing describes an apparatus 10, and its method of use, for manually soldering an article, in the form of a lead 12, to a metallized object, in the form of a metallized area 14, using a flux-containing solder 26 so as to achieve a reduced incidence of flux residues.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for soldering an object to an article in contact therewith, using a low-solids, flux-containing solder, so as to achieve a reduced amount of flux residues, comprising the steps of:
   manually applying heat to an article and an object in contact therewith;
   applying a low-solids, flux-containing solder to the article and the object so that the solder reflows and coats at least a portion of the article and object to bond them together; and
   simultaneously directing hot air into the region where the solder is applied to the article and the object to maintain the flux vapors in their vaporous state.

2. The method according to claim 1 wherein the hot air directed at the region where the solder is applied is obtained by passing compressed air through a vortex tube.

3. The method according to claim 1 wherein the heat is manually applied to the object and the article by contacting a separate one of the object and article with a heated tip.

* * * * *